(12) United States Patent
Pfeiffer et al.

(10) Patent No.: US 9,829,367 B2
(45) Date of Patent: Nov. 28, 2017

(54) FILL-LEVEL MEASURING DEVICE

(71) Applicant: Endress + Hauser GmbH + Co. KG, Maulburg (DE)

(72) Inventors: Helmut Pfeiffer, Steinen (DE); Benjamin Mack, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 402 days.

(21) Appl. No.: 14/391,187

(22) PCT Filed: Mar. 19, 2013

(86) PCT No.: PCT/EP2013/055616
§ 371 (c)(1),
(2) Date: Oct. 8, 2014

(87) PCT Pub. No.: WO2013/152926
PCT Pub. Date: Oct. 17, 2013

(65) Prior Publication Data
US 2015/0068300 A1    Mar. 12, 2015

(30) Foreign Application Priority Data

Apr. 12, 2012   (DE) .................. 10 2012 103 165

(51) Int. Cl.
*G01F 23/296*      (2006.01)
(52) U.S. Cl.
CPC ........ *G01F 23/296* (2013.01); *G01F 23/2967* (2013.01)
(58) Field of Classification Search
CPC .................... G01F 23/296; G01F 23/2967
See application file for complete search history.

(56) References Cited

U.S. PATENT DOCUMENTS 6,205,855 B1   3/2001 Pfeiffer
7,131,326 B2  11/2006 Ohmayer
(Continued)

FOREIGN PATENT DOCUMENTS

CN    1611340 A    8/2005
DE    3625779 A1   2/1988
(Continued)

OTHER PUBLICATIONS

Zhou, Huixing, et al. "Linear piezo-actuator and its applications." University of Leeds (2001).*
(Continued)

*Primary Examiner* — Lisa Caputo
*Assistant Examiner* — Punam Roy
(74) *Attorney, Agent, or Firm* — Bacon & Thomas, PLLC

(57) ABSTRACT

A fill-level measuring device having an oscillatory system, which has at least one external, tubular, oscillatory element and an inner oscillatory element. The outer oscillatory element at least sectionally coaxially surrounds the inner oscillatory element. In an inner space of the inner oscillatory element, a compensation apparatus shiftable in the axial direction and having at least a first locking element, a second locking element and a coupling element is arranged. The locking elements and the coupling element are composed of piezoelectric material, wherein the coupling element, the first locking element and the second locking element are connected with one another, and wherein the first locking element and the second locking element in a resting state are each connected by force interlocking, e.g. friction interlocking, with a wall of the inner space, and the fill-level measuring device has an electronics unit, which is embodied to position the compensation apparatus at a predeterminable position by means of electrical signals.

10 Claims, 2 Drawing Sheets

(56) References Cited

U.S. PATENT DOCUMENTS

| | | |
|---|---|---|
| 7,886,602 B2 | 2/2011 | Lopatin |
| 2011/0147086 A1 | 6/2011 | Hummes |
| 2013/0327140 A1* | 12/2013 | Lienenkamp ....... G01F 23/0007 |
| | | 73/290 V |

FOREIGN PATENT DOCUMENTS

| | | |
|---|---|---|
| DE | 3808481 A1 | 9/1989 |
| DE | 19651362 C1 | 6/1998 |
| DE | 102004009495 A1 | 9/2005 |
| DE | 102004011377 A1 | 9/2005 |
| EP | 2273239 A1 | 1/2011 |
| JP | S60-144619 A | 7/1985 |
| WO | WO 2004094964 A1 * 11/2004 ......... G01F 23/2967 |

OTHER PUBLICATIONS

Williams, Edward, Philip Loveday, and Nico Theron. "Design of a large-force piezoelectric Inchworm motor with a force duplicator." Robotics and Mechatronics Conference (RobMech), 2013 6th. IEEE, 2013.*

German Search Report, German Patent Office, Munich, dated Dec. 19, 2012.

International Search Report, EPO, The Netherlands, dated Aug. 14, 2013.

English Translation of the International Preliminary Report on Patentability, dated Oct. 23, 2014.

* cited by examiner

FILL-LEVEL MEASURING DEVICE

TECHNICAL FIELD

The present invention relates to a fill-level measuring device having an oscillatory system, which has at least one external, tubular, oscillatory element and an inner oscillatory element, wherein the outer oscillatory element at least sectionally coaxially surrounds the inner oscillatory element. Such fill level measuring devices are also known as single rod measuring devices. The fill-level measuring device serves for registering the fill level of a medium, especially of a bulk good, in a container. For example, the fill-level measuring device is used as a limit level switch for monitoring a predetermined maximum or minimum fill level.

BACKGROUND DISCUSSION

Known from German patent DE 19651362 C1 is a measuring device for fill-level monitoring having an oscillatory system, which is composed of two rods. In such case, an inner oscillatory rod is surrounded coaxially by an outer tubular oscillatory rod. Each of the oscillatory rods is secured via an elastic holding part to a shared carrier and are excited to execute opposite transverse oscillations with the eigenresonance frequency of the oscillatory system. The measuring device is mounted on a container in such a manner that the outer oscillatory rod contacts the fill substance as soon as such reaches the fill level to be monitored. Serving as measured variable for fill level detection is the oscillation amplitude.

In order to assure a decoupled oscillation in the case of accretion formation, the inner oscillatory rod includes a compensation mass, which is shiftably arranged, so that the resonant frequency of the inner oscillatory structure is adaptable to that of the outer oscillatory structure. The compensation mass is secured, for example, on an axially extending rod, which has a screw thread. A motor rotates the rod in such a manner that the compensation mass moves in the axial direction.

Described in Offenlegungsschrift (laid open application) EP 2273239 A1 is a fill level measuring apparatus, which likewise has two tubular oscillatory bodies arranged in one another. The outer oscillatory body is secured to a securement system via an elastic section. Arranged in the interior of the inner oscillatory body is a tuning body. The tuning body is sectionally elastically embodied and placed under compression in the inner oscillatory body. Furthermore, the tuning body includes a section with an external thread, which is matched to an internal thread in the inner wall of the inner oscillatory body. For adjusting the position of the tuning body, a frontal slot is provided, in which a displacement instrument, for example, a screw driver, can engage. The adjusting occurs manually or via a motor driven control.

A manual adjusting of the tuning body via the rod-shaped displacement instrument is uncomfortable. A motor control, in contrast, is complicated to put into practice. Furthermore, the described oscillatory system is relatively complicated to manufacture, because of the screw thread.

An object of the invention is to provide a fill-level measuring device having an easily displaceable tuning body.

SUMMARY OF THE INVENTION

The object is achieved by features including that in an inner space of the inner oscillatory element a compensation apparatus shiftable in the axial direction and having at least a first locking element, a second locking element and a coupling element is arranged, wherein the locking elements and the coupling element are composed of piezoelectric material, wherein the coupling element, the first locking element and the second locking element are connected with one another, and wherein the first locking element and the second locking element in a resting state are connected by force interlocking, e.g. friction interlocking, with a wall of the inner space, and that the fill-level measuring device has an electronics unit, which is embodied to position the compensation apparatus at a predeterminable position by means of electrical signals. By shifting the compensation apparatus in the inner oscillatory element, an energy non-equilibrium, such as can arise, for example, due to accretion formation on the outer oscillatory element or due to corrosion, is compensatable.

In a first embodiment, an added mass is secured to the first locking element and/or the second locking element.

In an embodiment, the inner oscillatory element is at least sectionally tubular.

In an embodiment, the compensation apparatus is embodied to move itself in the axial direction according to the inchworm principle.

An embodiment includes that the locking elements are polarized in the radial direction and the coupling element in the axial direction.

In a further development, the coupling element is embodied in such a manner that the coupling element in the case of being supplied with an electrical voltage experiences a longitudinal extension in the axial direction.

An embodiment provides that the electronics unit supplies the first locking element and the second locking element in the resting state with an electrical voltage and that the electronics unit for releasing the force interlocked connection between the wall and the first locking element or the second locking element reduces the electrical voltage, which the first locking element or the second locking element is supplied in the resting state.

In an embodiment, a driving/receiving unit is provided, which excites the outer oscillatory element and the inner oscillatory element to execute opposite mechanical oscillations with the resonant frequency.

In an embodiment, the electronics unit is embodied to shift the compensation apparatus upon a change of the frequency of the oscillations of the oscillatory system.

In a further development, the electronics unit is embodied to position the compensation apparatus in such a manner that the amplitude of the oscillations of the inner oscillatory element is maximum.

The fill-level measuring device of the invention has an automatically positionable tuning body in the form of the compensation apparatus. If accretion forms on the outer oscillatory element or corrosion occurs, there arises a non-equilibrium of the mass moment of inertia of the inner oscillatory element and of the outer oscillatory element. This is recognizable by a change of the oscillation frequency of the oscillatory system, as well as a lessened oscillation amplitude. The compensation apparatus is axially shiftable such that the mass moment of inertia of the inner oscillatory element is adjustable and thereby the oscillatory equilibrium is reestablished.

The compensation apparatus positions itself at the position in the inner oscillatory element required for this. To this end, only a corresponding control signal is required, which the electronics unit produces. The electronics unit calculates either the required position of the compensation apparatus and produces the control signal correspondingly, or the electronics unit monitors the oscillatory equilibrium and produces the control signal in such a manner that the resting state is maintained, in case the oscillatory system is tuned, and that the compensation apparatus shifts in the axial direction, if this is not the case. Since the movement of the compensation apparatus occurs according to the inchworm principle, the shifting occurs in steps of constant length. This step-wise movement is repeated until the position is achieved, at which the mass moment of inertia of inner and outer oscillatory elements at least essentially agree. This is detected, for example, by noting that the oscillation amplitude of the oscillatory system, respectively the oscillation amplitudes of inner and outer oscillatory elements, are maximum. By means of the inchworm principle, an exact positioning of the tuning body is possible, so that the fill level measurement is performable with high accuracy even in the case of changed boundary conditions, especially accretion formation. An intervention of operating personnel for manual updating is not required. Furthermore, the shifting of the compensation apparatus functions with high reliability without being susceptible to wear.

BRIEF DESCRIPTION OF THE DRAWINGS

The invention will now be explained in greater detail based on the appended schematic drawing, the figures of which show as follows.

DETAILED DISCUSSION IN CONJUNCTION WITH THE DRAWINGS

Figure 1:
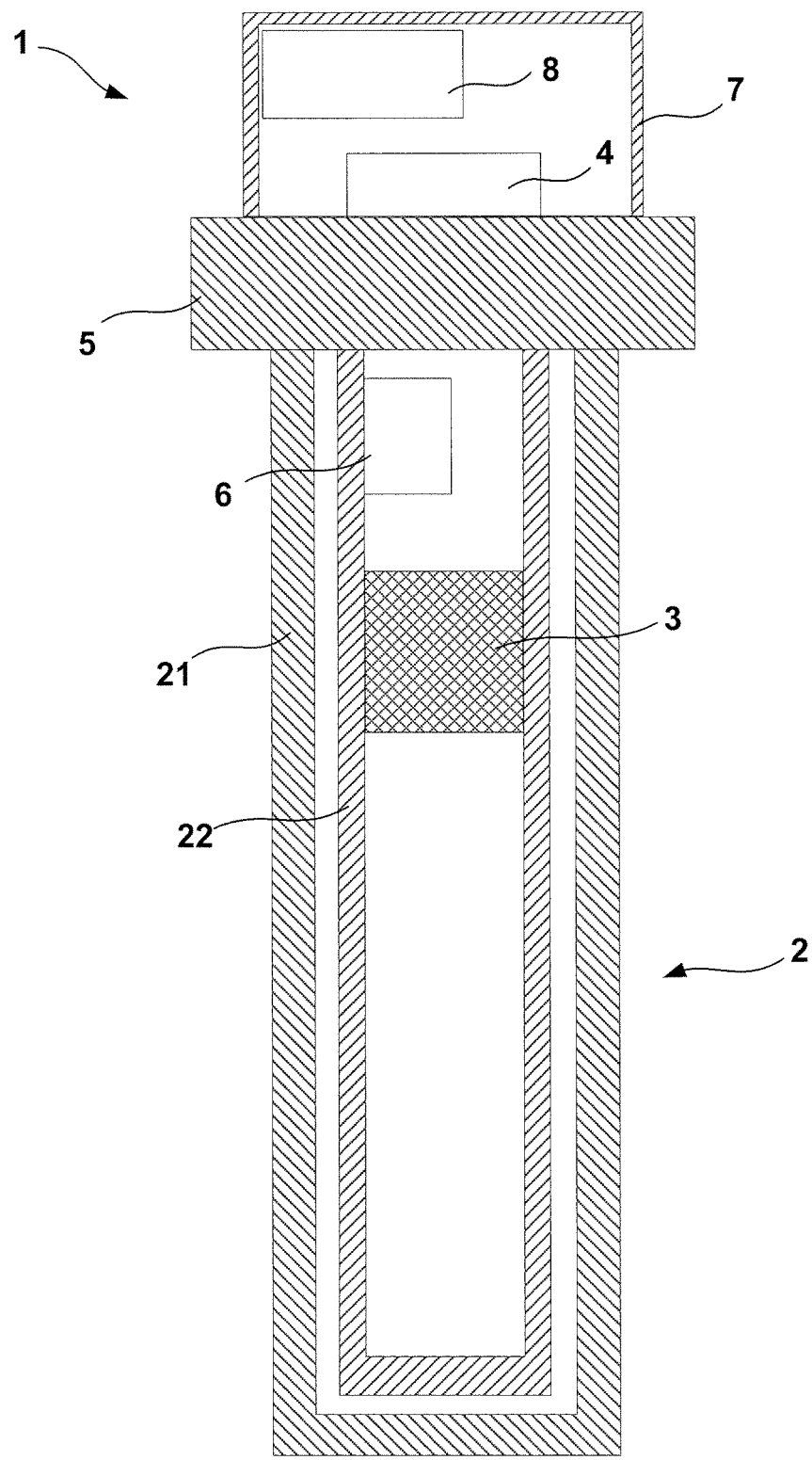
FIG. 1 is a fill-level measuring device having an oscillatory system with an inner and an outer oscillatory element.

FIG. 1 is a schematic view of a vibronic fill-level measuring device 1. The oscillatory system 2 is composed of an inner oscillatory element 22 and an outer oscillatory element 21, wherein the outer oscillatory element 21 is tubular and coaxially surrounds the inner oscillatory element 22. The inner oscillatory element 22 is likewise essentially tubular. In the region of the process connection 5, the outer oscillatory element 21 and the inner oscillatory element 22 are mechanically coupled with one another. A driving/receiving unit 4 excites the oscillatory system 2 to execute mechanical oscillations and receives a signal representing the mechanical oscillations of the oscillatory system 2. By means of the process connection 5, the fill-level measuring device 1 is securable in a wall of a container in such a manner that the oscillatory system 2 protrudes inwardly into the interior of the container. A field housing 7, which, among other things, accommodates a control/evaluation unit 8, for example, in the form of a microcontroller, for controlling the measuring and determining the fill level, remains outside of the container. Depending on embodiment of the oscillatory system 2 and the driving/receiving unit 4, also the driving/receiving unit 4 is arranged in the field housing 7.

Driving/receiving unit 4 is embodied, for example, as a piezoelectric transducer unit. Such transducer units are sufficiently known from the state of the art, so that here their operation is explored only briefly. In one variant, a plurality of piezoelectric drive elements and piezoelectric receiving elements are arranged in a stack, which is placed under prestress between a securement means in the field housing 7 and a base of the oscillatory system 2. In another variant, a disc shaped piezoelectric element is polarized in such a manner and provided with an electrode structure such that the element serves both as drive element as well as also as receiving element. Known are also embodiments, in which the inner oscillatory element 22 is connected with the outer oscillatory element 21 in the end region facing away from the process connection 5 and the driving/receiving unit 4 is arranged in this process-facing end region. Common to all embodiments is that the control/evaluation unit 8 supplies the piezoelectric transducer unit with an electrical exciter signal, which leads to deformation of the drive elements. The mechanical movements of the oscillatory system 2 are transduced by the transducer unit into an electrical, received signal, which the control/evaluation unit 8 evaluates for ascertaining the fill level.

Alternatively, the oscillatory system is excitable, for example, by means of a magneto electric drive, to execute oscillations, wherein the receiving unit can likewise be embodied magneto electrically or piezoelectrically.

For fill level measurement, the control/evaluation unit 8 produces the drive signal in such a manner that the driving/receiving unit 4 excites the oscillatory system 2 to execute resonant oscillations. The outer oscillatory element 21 and the inner oscillatory element 22 are embodied in such a manner that they oscillate with the same resonant frequency. The outer oscillatory element oscillates, in such case, oppositely to the inner oscillatory element 22. In this way, it is prevented that forces act on the process connection 5, which could corrupt the measuring. For fill level measurement, the control/evaluation unit 8 evaluates the amplitude of the electrical, received signal. If the outer oscillatory element 21 is covered with the medium to be detected, the mechanical oscillations are damped, what leads to a lessened amplitude.

If accretion forms on the outer oscillatory element 21 or corrosion occurs, then the resonant frequency of the oscillatory system 2 changes. Furthermore, the oscillation amplitude gets smaller, since the two oscillatory elements 21, 22 are then no longer matched to one another. In order also in the case of accretion formation and corrosion to enable a precise measuring, there is arranged in the inner oscillatory element 22 a compensation apparatus 3, by means of which the mass moment of inertia of the inner oscillatory element 22 is adjustable in such a manner that the oscillatory system 2 is retuned. Preferably, the electronics unit 6 determines the oscillation amplitude of the oscillatory system 2 or of the inner oscillatory element 22 and adjusts the compensation apparatus 3 in such a manner that an amplitude maximum is tuned in. The shifting is, in such case, preferably triggered by a change of the resonant frequency. In order to be able to react equally to a lessened and an increased resonant frequency, the electronics unit 6 determines the direction of the change of the resonant frequency and controls the direction of the shifting of the compensation apparatus 3 accordingly. In the case of accretion formation, the resonant frequency of the oscillatory system 2 lessens, so that a shifting of the compensation apparatus 3 away from the process connection 5 is required. In the case of corrosion, correspondingly, a shifting in the reverse direction is necessary. Compensation apparatus 3 represents a movable mass, whose shifting in the axial direction, because of the coupling of the inner oscillatory element 22 and the outer oscillatory element 21, effects a change of the resonant frequency and amplitude of the oscillatory system 2.

Compensation apparatuses in the form of an axially displaceable, added mass are known from the state of the art.

According to the invention, the compensation apparatus 3 is embodied in such a manner that it is shiftable by means of the inchworm principle. This offers the advantage that the compensation apparatus 3 is newly positioned as a function of electrical control signals. A manual shifting is not required. Furthermore, a motor does not need to be placed in the field housing 7 for automatic actuating of a displacement apparatus.

The electrical control signals for the compensation apparatus 3 are produced by the electronics unit 6. The electronics unit 6 can be embodied as part of the control/evaluation unit 8 or as a separate unit. For example, the electronics unit 6 is embodied as a microcontroller.

For illustration of a concrete embodiment of the compensation apparatus 3 and for purposes of explanation of the operation of the axial shifting of the compensation apparatus 3, FIGS. 2a-2d show the inner oscillatory element 21 with the therein arranged compensation apparatus 3 at four points in time. The representation is not true to scale; for purposes of explanation, the resulting length changes are magnified.

Figure 2A:
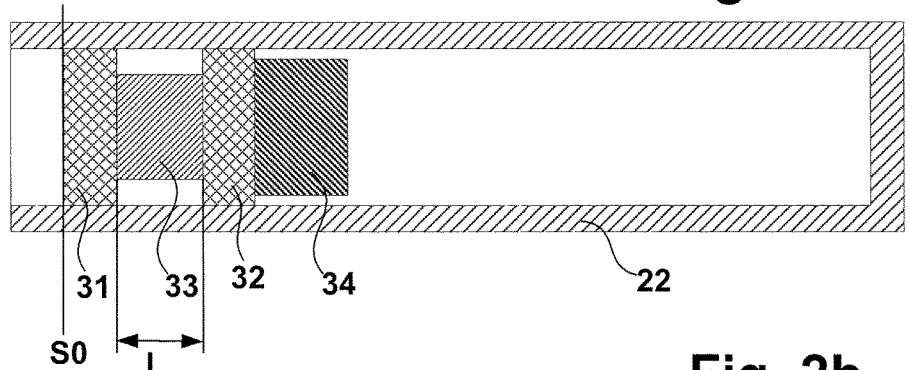
FIG. 2a shows the compensation apparatus in the inner oscillatory element in the resting state.

FIG. 2a shows the resting state of the compensation apparatus 3. In the resting state, the compensation apparatus 3 is located locked at a certain position S0. In the position S0, the resonance frequencies, respectively the mass moments of inertia, of the inner oscillatory element 22 and the outer oscillatory element are the same. The position S0 of an oscillatory system tuned at manufacturing lies, for example, as seen from the process connection 5 at a fourth of the length of the inner oscillatory element 22. From this starting position, the compensation apparatus 3 is shiftable in the axial direction. Referred to as resting state is not only the starting position S0 occupied at manufacturing, but, instead, in each case, a state, in which the oscillatory system is tuned, i.e. the compensation apparatus 3 is positioned in such a manner and connected with the inner oscillatory element 22 by force interlocking, e.g. friction interlocking, that the resonance frequencies of outer oscillatory element 21 and inner oscillatory element 22 are the same.

Compensation apparatus 3 includes a first locking element 31 and a second locking element 32, which are connected fixedly with one another via a coupling element 33. Secured to the second locking element 32 is an added mass 34, whose position influences the mass moment of inertia and, thus, also the resonant frequency and oscillation amplitude of the inner oscillatory element 22. Material and mass of the added mass 34 are selectable as desired as a function of the embodiment of the oscillatory system. The system of locking elements 31, 32 and coupling element 33 serves for transport of the added mass 34. In an embodiment, the added mass 34 makes up the predominant part of the total mass of the compensation apparatus 3. In another embodiment, no added mass 34 is present. In this case, the locking elements 31, 32 and the coupling element 33 form the additional mass for compensation of a changed mass moment of inertia of the outer oscillatory element 21. Other embodiments are possible, which lie between these extreme cases.

First locking element 31 and second locking element 32 are disc shaped. The inner diameter of the inner oscillatory element 22 equals the diameter of the first locking element 31 and the second locking element 32, so that these elements 31, 32 mechanically contact the inner wall of the inner oscillatory element 22. Especially, the two locking elements 31, 32 are connected with the inner wall of the inner oscillatory element 22 by force interlocking, e.g. frictional interlocking. The diameter of the coupling element 33 is smaller than the diameter of the locking elements 31, 32, so that coupling element does not directly contact the inner oscillatory element 22. The thickness of the coupling element 33, i.e. its dimension L in the axial direction, can be equal to, less than or greater than the thickness of the locking elements 31, 32. Preferably, the thickness of the coupling element 33 is greater than that of the locking elements 31, 32. For example, the thickness of the locking elements 31, 32 and the coupling element 33 amounts to between 1 and 10 millimeter.

The two locking elements 31, 32, as well as the coupling element 33, are composed of piezoelectric material. Piezoelectric elements change volume with application of an electrical voltage, wherein an expansion or a shrinking occurs principally in the polarization direction. While the two locking element 31, 32 are polarized in the radial direction, the coupling element has a polarization in the axial direction. The two circularly shaped faces of the disk shaped locking elements 31, 32 are each provided with an electrode, for example, in the form of a coating, so that an electrical voltage can be applied to the locking elements 31, 32. Due to the polarization in the radial direction, a locking element 31, 32 experiences a length change in the radial direction upon being supplied with a voltage. For example, the first locking element 31 and the second locking element 32 are supplied with a voltage in the resting state, whereby the two locking element 31, 32 are locked in the tubular inner oscillatory element 22.

For reestablishing the oscillatory equilibrium, which is distinguished by an oscillation of the oscillatory system 2 with a maximum amplitude, the position of the compensation apparatus 3 is changeable. In such case, the updating of the position occurs iteratively, in each case, by a distance dL, until the oscillation amplitude of the inner oscillatory element 22 assumes a maximum value and the energy equilibrium is reestablished. In this state, also the oscillation amplitude of the total oscillatory system 2 is maximum. The displacement distance dL is relatively small and lies usually in the region of a few micrometer. In order to achieve a shifting by a greater distance in the millimeter range within a short time, a correspondingly high clocking rate is required for the repeated shifting by the distance dL. Since accretion, as a rule, builds slowly, an updating with a lesser clocking rate is generally sufficient. Preferably, the clocking rate is dynamically changeable. For example, the electronics unit 6 determines the required shifting and selects the clocking rate in accordance with the path length.

In an embodiment, the control/evaluation unit 8 and/or the electronics unit 6 determines an occurring change of the resonant frequency quantitatively and ascertains the displacement path required for the compensation, respectively the required position of the compensation apparatus 3. For this, the difference between the current resonant frequency and the earlier resonant frequency assumed in the tuned state is determined. Via the required matching of the mass moment of inertia of the outer oscillatory element 21, in given cases accreted, and that of the inner oscillatory element 22 with compensation apparatus 3, the position of the compensation apparatus 3, respectively the distance, by which the compensation apparatus 3 must be shifted, is determinable.

In another embodiment, an acceleration sensor measures forces, which occur in the case of an uncompensated oscillatory system and the electronics unit 6 controls the shifting of the compensation apparatus 3 correspondingly in such a manner that the arising forces are minimal.

Figure 2B:
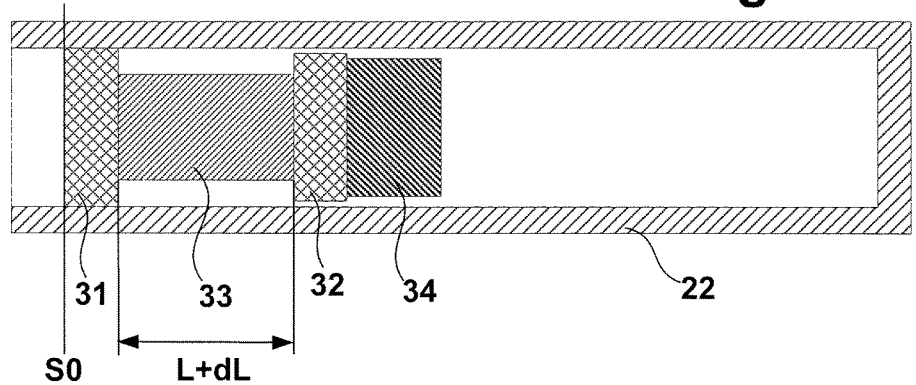
FIGS. 2b-2d shows stages of the compensation apparatus in the inner oscillatory element during the shifting of the compensation apparatus.

A first step for shifting the compensation apparatus 3 is shown in FIG. 2b. For releasing the mechanical connection of the second locking element 32 with the inner wall of the inner oscillatory element 22, the electronics unit 6 reduces the voltage on the second locking element 32, preferably to zero. In this way, the diameter of the second locking element 32 lessens, so that there is no longer contact with the inner wall. Furthermore, the electronics unit 6 supplies the coupling element 33 with a voltage. The coupling element 33 experiences thereby a length change of magnitude dL in the axial direction. Since the first locking element 31 is locked at the position S0, the second locking element 32 and the added mass experience due to the length change dL a shifting in the axial direction by the distance dL.

Figure 2C:
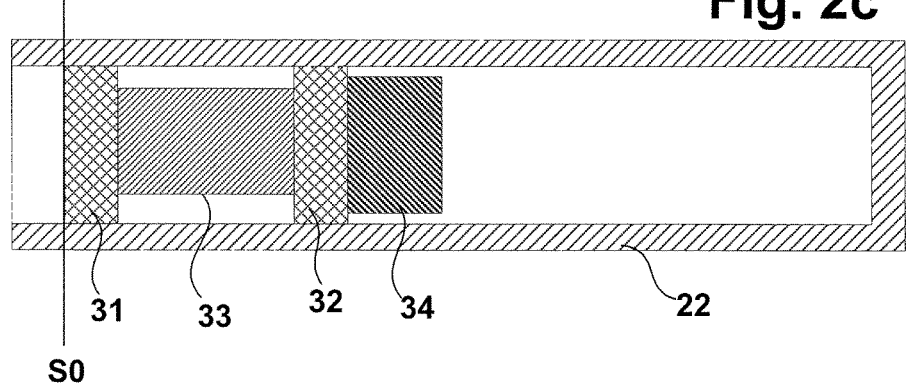

In the next step illustrated in FIG. 2c, the voltage application on the coupling element 33 is maintained while the electronics unit 6 supplies the second locking element 32 again with the initial voltage, so that the second locking element 32 is locked to the inner oscillatory element 22 at the new position by force interlocking, e.g. friction interlocking.

Figure 2D:
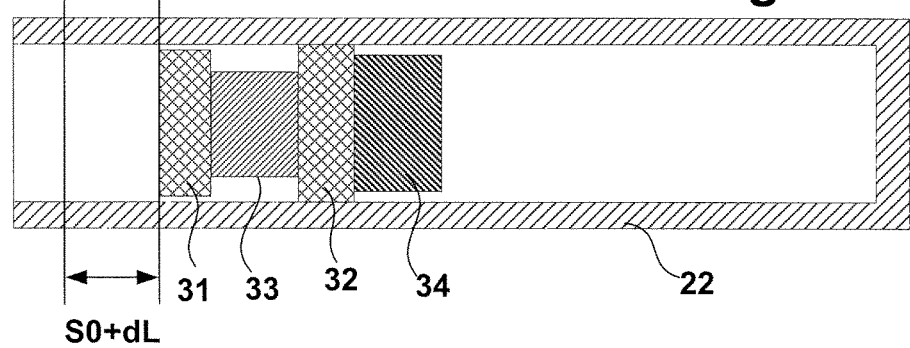

In the last step, which in FIG. 2d is shown, the electronics unit 6 releases the connection of the first locking element 31 with the inner oscillatory element 22 by interrupting or at least reducing the voltage supplied to the first locking element 31. Furthermore, the electronics unit 6 terminates the supply of the coupling element 33 with the earlier applied voltage. The coupling element 33 shrinks back to its original length L. Because the second locking element 32 is locked to the inner wall, the coupling element 33 draws the first locking element 31 with it, so that now also the first locking element 31 is brought to the position S0+dL.

Upon supplying the first locking element 31 again with the initial voltage, the compensation apparatus 3 has returned to the resting state illustrated in FIG. 2a, however, now at the position S0+dL. Following on the described cycle is preferably directly the next of n cycles, until the end state at the position S0+ndL is achieved.

The invention claimed is:

1. A fill-level measuring device comprising:
   an oscillatory system, which is excitable to execute mechanical oscillations; and
   an electronics unit,
   wherein, said oscillatory system comprises;
   at least one external, tubular, oscillatory element;
   an inner oscillatory element; and
   a compensation apparatus, wherein:
   said external oscillatory element at least sectionally coaxially surrounds the inner oscillatory element;
   said compensation apparatus is arranged in an inner space of said inner oscillatory element;
   said compensation apparatus shiftable in the axial direction and has at least a first locking element, a second locking element and a coupling element;
   said locking elements and said coupling element are composed of piezoelectric material;
   said coupling element, said first locking element and said second locking element are connected with one another;
   said first locking element and said second locking element, in a resting state, are each connected by force interlocking, e.g. frictional interlocking, with a wall of the inner space; and
   said electronics unit is embodied to position said compensation apparatus at a predeterminable position by means of electrical signals.

2. The fill-level measuring device as claimed in claim 1, wherein:
   an added mass is secured to said first locking element and/or said second locking element.

3. The fill-level measuring device as claimed in claim 1, wherein:
   said inner oscillatory element is at least sectionally tubular.

4. The fill-level measuring device as claimed in claim 1, wherein:
   said compensation apparatus is embodied to move itself in the axial direction according to the inchworm principle.

5. The fill-level measuring device as claimed in claim 1, wherein:
   said locking elements are polarized in the radial direction; and
   said coupling element is polarized in the axial direction.

6. The fill-level measuring device as claimed in claim 1, wherein:
   said coupling element is embodied in such a manner that said coupling element in the case of being supplied with an electrical voltage experiences a longitudinal extension in the axial direction.

7. The fill-level measuring device as claimed in claim 1, wherein:
   said electronics unit supplies said first locking element and said second locking element in the resting state with an electrical voltage; and for releasing the force interlocked connection between the wall and said first locking element or said second locking element, said electronics unit reduces the electrical voltage, which said first locking element or said second locking element is supplied in the resting state.

8. The fill-level measuring device as claimed in claim 1, further comprising:
   a driving/receiving unit, which excites said outer oscillatory element and the said inner oscillatory element to execute opposite mechanical oscillations with the resonant frequency of said oscillatory system.

9. The fill-level measuring device as claimed in claim 1, wherein:
   said electronics unit is embodied to shift said compensation apparatus upon a change of the frequency of the oscillations of said oscillatory system.

10. The fill-level measuring device as claimed in claim 1, wherein:
    said electronics unit is embodied to position said compensation apparatus in such a manner that the amplitude of the oscillations of said inner oscillatory element is maximum.

* * * * *